United States Patent [19]
Maruta et al.

[11] Patent Number: 5,803,554
[45] Date of Patent: Sep. 8, 1998

[54] BRAKE MONITORING DEVICE FOR RAILROAD CARS

[75] Inventors: Seiki Maruta; Shigeaki Doto, both of Kobe, Japan

[73] Assignee: Nabco Ltd., Kobe, Japan

[21] Appl. No.: 653,076

[22] Filed: May 21, 1996

[51] Int. Cl.$^6$ ..................................................... B60T 13/74
[52] U.S. Cl. .................................. 303/3; 303/15; 303/20; 303/7
[58] Field of Search ............................... 303/3, 20, 7, 15, 303/16; 364/426.01; 318/372, 373; 701/78

[56] References Cited

U.S. PATENT DOCUMENTS

4,624,506  11/1986  Doto ....................................... 303/20 X
4,685,750   8/1987  Imanaka ................................. 303/20 X Primary Examiner—Lee W. Young
Attorney, Agent, or Firm—James Ray & Associates

[57] ABSTRACT

A brake monitoring device for railroad cars is provided with a first comparison unit which compares the electrical brake power equivalent signal with a first standard value, judges whether or not electrical brake power is generated and closes the locomotive brake deficit check circuit with an interlock relay when such electrical brake power equivalent signal is smaller than such first standard value and which opens the locomotive brake deficit check circuit when it is larger. Such brake monitoring device also includes a second comparison unit which compares the electrical brake power equivalent signal with a second standard value which judges whether or not electrical brake power is supplied to the brake power of the trailer car. Such device closes the trailer car brake deficit check circuit with such interlock relay when the electrical brake power equivalent signal is smaller than the second standard value and opens the trailer car brake deficit check circuit when it is larger. Thus, in cases where brake power is not supplied to the trailer car, even if brake power is generated, it is still possible to greatly improve the safety and simplicity of the delayed-action control brake device.

13 Claims, 7 Drawing Sheets

BRAKE MONITORING DEVICE FOR RAILROAD CARS

FIELD OF THE INVENTION

The present invention relates, in general, to a monitoring device for brake devices utilized on railroad cars and, more particularly, this invention relates to a monitoring device that detects deficits of pneumatic brakes in railway type brake systems employing combined electro-pneumatic delayed-action control.

BACKGROUND OF THE INVENTION

An example of this type of monitoring device for the brake devices of railroad cars is disclosed in the prior art of, for example, Japanese Laid-Open Utility Model Application H2-96354. Also, an example of delayed-action control of brake devices for railroad cars is the art disclosed in Japanese Laid-Open Patent Application S63-10024. Such monitoring device is described in connection with a railway car that does not employ delayed-action control, but an example of its application to a brake device with such delayed-action control is described in conjunction with FIGS. 4 through 6.

Figure 4:
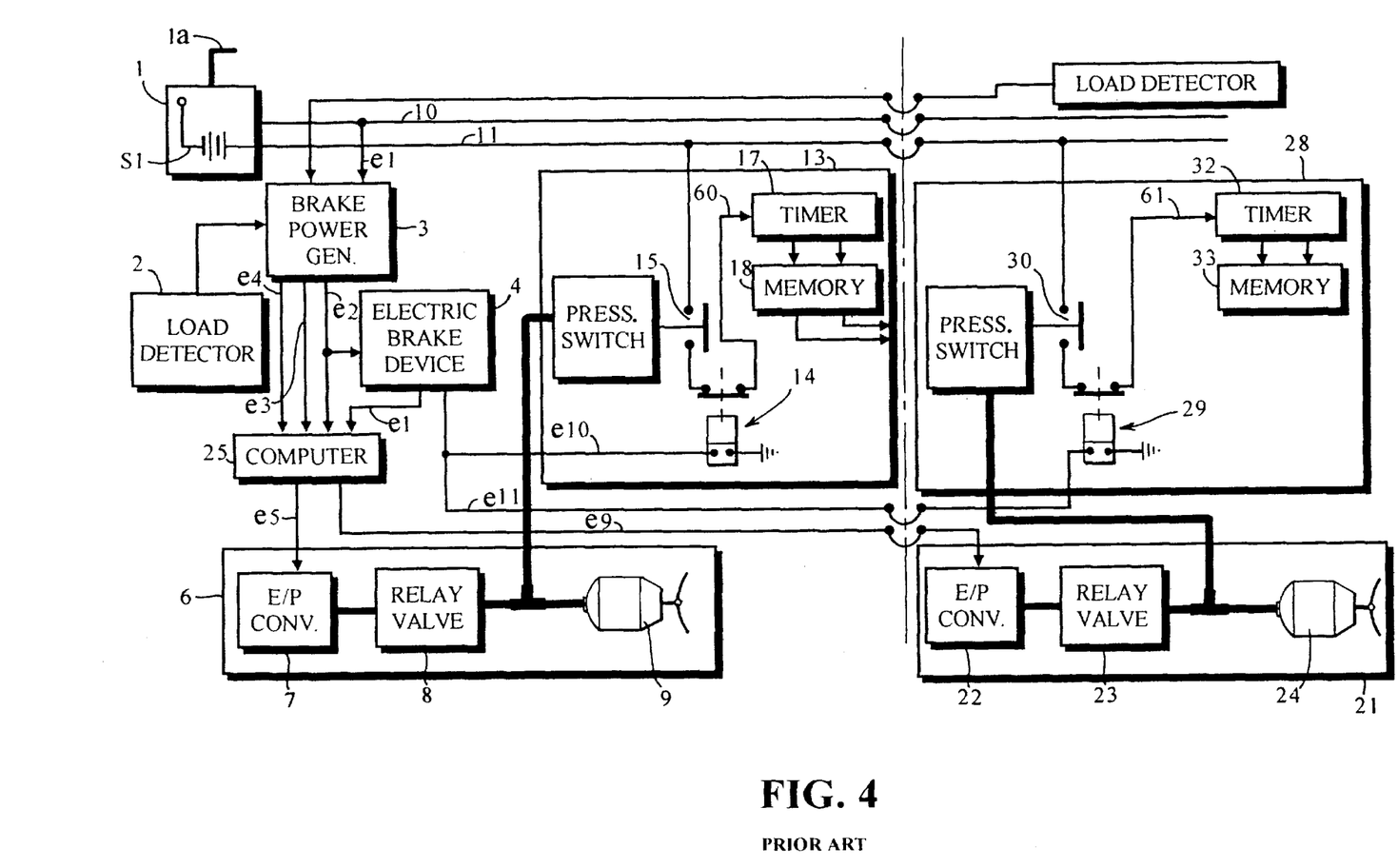
FIG. 4 is a block diagram showing the configuration of a conventional prior art brake monitoring device.

In FIG. 4, the composite car consists of both a locomotive and a trailer car. In the locomotive, there is a brake controller 1 which outputs a brake power command signal $e_1$ via a brake command line 10, according to the manipulator variable of handle 1a, and a standard brake power generator 3, respectively, that generates a brake power command signal $e_5$ required by the trailer car and the brake power command signal $e_4$ required by the locomotive. This brake power command signal $e_1$ is based on each signal of the locomotive and trailer car load response apparatus 2 and 20. The brake power generator 3 generates a composite brake power command signal $e_2$ by adding these together.

Electrical brake device 4 generates electrical brake power based on this composite brake power command signal $e_2$, and outputs electrical brake power equivalent signal $e_3$ corresponding to the electrical brake power actually generated. A computer 5 computes the supplementary pneumatic brake power which is the deficit (difference) between the actual electrical brake power and the overall brake power from such composite brake power signal $e_2$ and the electrical brake power equivalent signal $e_3$, and distributes this supplementary pneumatic brake power to the trailer car and the locomotive based on brake power signal $e_5$ required by the trailer car and brake power signal $e_4$ required by the locomotive, and respectively outputs them as a locomotive supplementary pneumatic brake power command signal $e_8$ and trailer car supplementary pneumatic brake power command signal $e_9$ to the locomotive pneumatic brake device 6 and trailer car pneumatic brake device 21.

In such locomotive pneumatic brake device 6 and the trailer car pneumatic brake device 21, compressed air is expelled from electropneumatic valves 7 and 22, respectively, according to each supplementary pneumatic brake power command signal $e_8$ and $e_9$. This compressed air is supplied to the brake cylinders 9 and 24 after their flow rates are amplified by relay valves 8 and 23, and pneumatic brake power corresponding to the difference between the electrical brake power and the overall brake power is thereby generated and distributed to the trailer car and the locomotive.

Meanwhile, pressure-detecting switches S3 and S5 which are opened and closed according to the pressure in such brake cylinders 9 and 21 are respectively provided on the trailer car monitoring device 28 and the locomotive monitoring device 13, which, respectively, have trailer car pneumatic brake device 21 and locomotive pneumatic brake device 6. The pressure-detecting switches S3 and S5 are connected to branch lines 15 and 30 of a brake deficit check line 11 which is connected to deficit check switch S1 in such brake controller 1.

Also, electrical brake device 4 is connected to interlock relays 14 and 29 of deficit check circuits 60 and 61, and during the generation of electrical braking, pressure is applied to the interlock relays 14 and 29 and such contact points open. Next, each contact point of these interlock relays 14 and 29 is connected to each timer circuit 17 and 32, and furthermore such timer circuits 17 and 32 are connected to each memory circuit 18 and 33.

In this case, such pressure-detecting switches S3 and S5 are closed when the pressure in brake cylinders 9 and 24 is below the pneumatic brake deficit detection pressure $p_1$, and they are open when it exceeds the pneumatic brake deficit detection pressure $p_1$. Also, the deficit check switch S1 of such brake controller 1 is closed when the manipulator variable of handle 1a is above a specific amount, and the detection pressure of pressure-detecting switches S3 and S5 is set according to a specific amount.

On the other hand, when the handle 1a of brake controller 1 is operated in the brake position (i.e., above a specific amount), while an electrical braking force is being generated at such electrical brake device 4, because the coil of the interlock relay 14 is magnetized and its contact points are in the open (cut-off) position, the signal from pneumatic brake check line 11 is not input into the timer circuit 17 and the locomotive monitoring device 13 is released. But if such electrical brake power becomes invalid, interlock relay 14 is demagnetized and its contact points are closed, so that if the pressure in the brake cylinder 9 is below pneumatic brake power deficit detection pressure $P_1$, pressure-detecting switch S3 closes so that the signal from pneumatic brake deficit check line 11 is input to timer circuit 17 and storage circuit 18 and the locomotive monitoring device 13 detects the pneumatic brake power deficit after the time limit of timer circuit 17. The operation of trailer car monitoring device 28 is exactly the same as the above operation of the locomotive monitoring device 13, and its description is therefore omitted.

Figure 5:
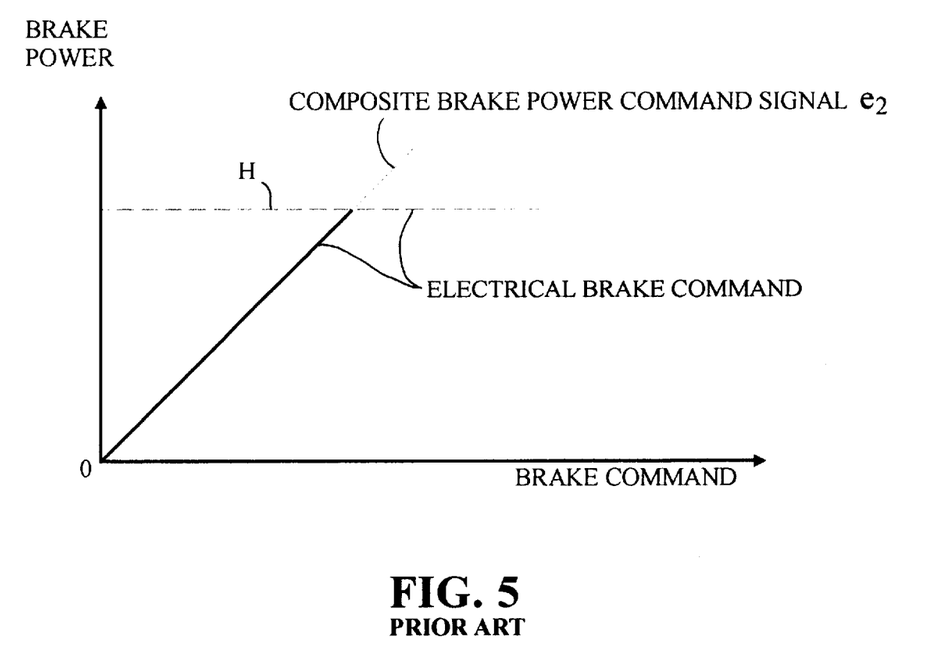
FIG. 5 illustrates the relationship between the brake power and brake command of prior art brake devices.

Next, the delayed-action control of the above-mentioned brake device is described with particular reference to FIG. 5 and FIG. 6. In FIG. 5, the composite brake power command signal $e_2$ is given limiter characteristics by a limiter (not shown in FIG. 4) before being input into such electrical brake device 4 shown in FIG. 4. That is to say, the electrical brake force command is limited to below the maximum grip brake force H of the locomotive. In this way, when the electrical brake action rate (referred to hereinafter as the electrical control rate) is 100%, the locomotive is subjected to the entire brake force of the composite car when the composite brake force command signal $e_2$ is less than the maximum grip braking force H of the locomotive, and when the composite brake force command signal $e_2$ is larger than the maximum grip brake force H, the trailer car is subjected to the pneumatic braking force of the deficit while the locomotive continues to support the maximum grip brake force, and the electrical brake force of the locomotive is used to the maximum limit.

Figure 6A:
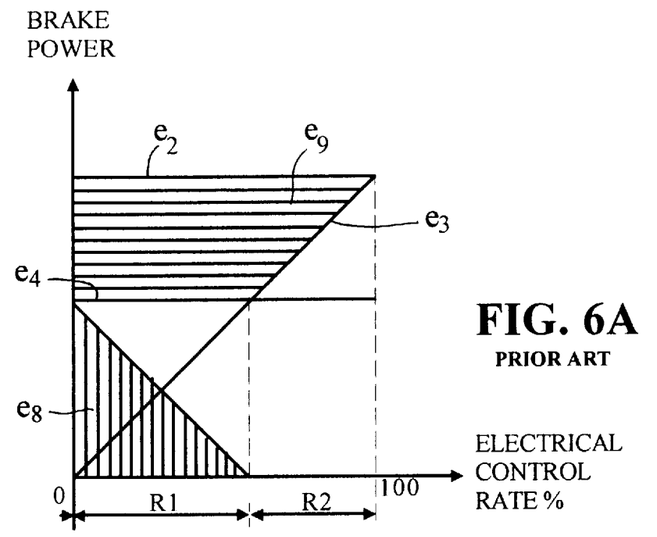
FIG. 6 illustrates the relationship between the brake power and the electrical control rate of prior art brake devices.

Next, computer 5 of FIG. 4 performs the computation shown in FIG. 6 regarding the distribution of supplementary pneumatic braking accompanying a change in the electrical control rate. FIG. 6(a) is the case of low notching of the brake commands, in other words, when the composite brake power command signal $e_2$ is below the maximum grip brake power H.

In FIG. 6(a) as the electrical control rate decreases below 100%, the deficit of the electrical brake power $e_3$ with respect to the composite brake power command signal $e_2$ is first taken up by the supplementary brake force (=trailer car supplementary hydraulic brake force command signal $e_9$) of the trailer car (range R2), and when the electrical control rate further decreases and the brake force required by the locomotive (=brake power command signal $e_4$ required by the locomotive) the deficit begins to be taken up by the supplementary pneumatic brake force (=locomotive supplementary hydraulic brake force command signal $e_8$) of the locomotive (range R1).

Figure 6B:
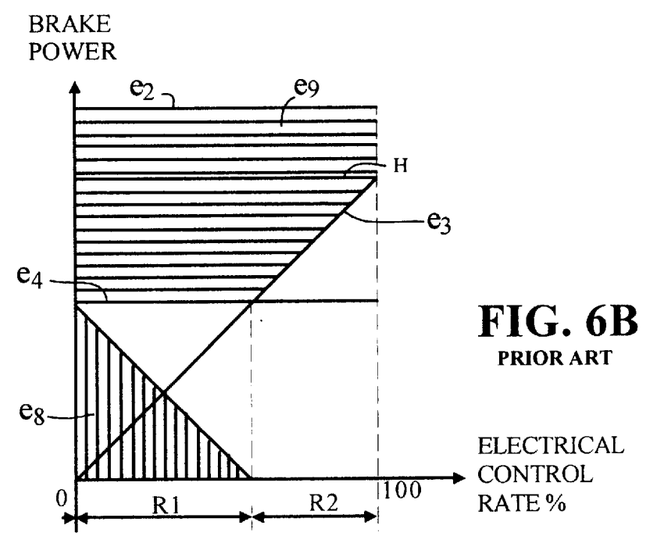

FIG. 6(b) is the situation during high brake command notching, in other words, the case when the composite brake power command signal $e_2$ is larger than the maximum grip brake power H. In this case, the amount by which the maximum grip braking force H of the locomotive is exceeded is taken up by the supplementary pneumatic brake force $e_9$ of the trailer car and is otherwise the same as FIG. 6(a).

It so happens that in the above-mentioned brake monitoring device, as regards the deficit monitoring of pneumatic brake power, when electrical brake power is not generated, the electrical control availability signal $e_7$ from electrical brake device 4 is cleared. First interlock relay 14 and second interlock relay 29 of locomotive monitoring device 13 and trailer car monitoring device 28 are demagnetized and their contact points are opened. The brake deficit check circuits 60 and 61 are closed if a voltage is applied to the pneumatic brake check line 11, and deficit monitoring of the pneumatic brakes of the locomotive and trailer car is performed.

On the other hand, when electrical brake power is generated, electrical control availability signal $e_7$ is output from the electrical brake device 4. First interlock relay 14 and second interlock relay 29 are magnetized and their contact points are opened, and even if a voltage is applied to pneumatic brake check line 11, pneumatic brake deficit check circuits 60 and 61 are not closed and deficit monitoring of the pneumatic brakes of the locomotive and trailer car is not performed.

This has the following disadvantages. That is, it has the disadvantage that in cases where electrical brake power is generated but the electrical brake power is not supplied to the brake power of the trailer car (range R1 of FIG. 6), in the event of some fault developing in the pneumatic brake of the trailer car (for example a faulty relay valve, a drop in braking pressure, and so on) regardless of the actual brake deficit state, since the pneumatic brake deficit monitoring of the trailer car is not performed as mentioned above, this brake deficit state is not detected.

As a result, there has been the problem that the stopping distance of the cars has lengthened. In particular, this effect is large in composite cars where the M/T ratio is smaller compared with conventional methods by using induction motors as the main motor. This effect can be fatal with regard to high speed/high density driving which requires high speed deceleration.

The present invention has been made in view of these disadvantages of such prior art, and its objective is to provide a brake monitoring device with improved safety in a delayed-action control brake device wherein electrical brake force is generated but deficit monitoring of the pneumatic brake system of the trailer car is performed when electrical brake power is not supplied to the brake power of the trailer car.

SUMMARY OF THE INVENTION

The present invention provides apparatus in which an electrical brake power equivalent signal is compared with a first standard value, and when the electrical brake power equivalent signal is smaller than such first standard value in the results of this comparison, the brake deficit check circuit is closed by an interlock means of the locomotive. In this manner the pneumatic brake power deficit monitoring of such locomotive is performed. Meanwhile, the electrical brake power equivalent signal is also compared with a second standard value in the trailer car, but since this second standard value is larger than such first standard value, the electrical brake power equivalent signal of this state is smaller than such second standard value, it closes the brake deficit check circuit with such interlock means of the motor and such pneumatic brake power deficit is thereby monitored.

Also, when the result of such comparison is larger than such first standard value and smaller than such second standard value, each interlock means opens the brake deficit check circuit of such locomotive and closes the brake deficit check circuit of such trailer car, so that only such pneumatic brake power deficit of such locomotive is monitored, without monitoring such pneumatic brake power deficit of such locomotive.

Furthermore, when the results of such comparison is larger than such second standard value, both interlock means open both brake deficit check circuits, so that the deficit of pneumatic brake power is not monitored in either such locomotive or such trailer car.

OBJECTS OF THE INVENTION

It is, therefore, one of the primary objects of the present invention to provide a railroad car brake monitoring device with a brake controller that outputs a brake command signal according to its manipulated variable.

Another object of the present invention is to provide a brake power generator which outputs a brake power signal required by such locomotive and a brake power signal required by such trailer car and a composite brake power command signal that is the sum of these, with respect to such brake command signal.

Still another object of the present invention is to provide an electrical brake device which generates electrical brake power according to an electrical brake power command generated based on such composite brake power command signal and outputs an electrical brake power equivalent signal that is equivalent to this actual electrical brake power.

Yet still another object of the present invention is to provide a brake device which includes a supplementary computation means that uses such electrical brake power equivalent signal, such brake power signal required by the locomotive, such brake power signal required by the trailer car, and such composite brake power command signal to compute a supplementary pneumatic brake power command signal that is the difference between such actual electrical brake power and such composite brake power command signal and which outputs this supplementary pneumatic brake power signal distributed between such locomotive pneumatic brake devices and such trailer car pneumatic brake devices.

A further object of the present invention is to provide a brake device in which interlock means are, respectively, provided with brake deficit check circuits that monitor the output status of such locomotive and trailer car brake devices and which take as their input brake deficit check signals output by such brake controller during brake commands and the output of such pneumatic brake devices of such locomotive or trailer car and which close or open such brake deficit check circuit according to such actual electrical brake power from such electrical brake device.

An additional object of the present invention is to provide a brake device which is provided with a first comparison means that compares such electrical brake power equivalent signal with a first standard value that judges whether or not electrical brake power is generated and which closes such locomotive brake deficit check circuit with such interlock means of such locomotive when such electrical brake power equivalent signal is smaller than such first standard value and opens such locomotive brake deficit check circuit when it is larger and a second comparison means that compares the electrical brake power equivalent signal with a second standard value that is set larger than such first standard value and judges whether or not such electrical brake power is supplying the brake power for such trailer car and closes such trailer car brake deficit check circuit with such interlock means of such trailer car when such electrical brake power equivalent signal is smaller than such second standard value and opens such trailer car brake deficit check circuit when it is larger.

In addition to the objects and advantages of the present invention which has been described in detail above, various other objects and advantages will become readily apparent to those persons skilled in railroad braking systems from the following more detailed description of such invention particularly when such description is taken in conjunction with the attached drawing Figures and with the appended claims.

DESCRIPTION OF THE PRESENTLY PREFERRED EMBODIMENT OF THE INVENTION

Prior to proceeding to the more detailed description of the present invention, it should be noted that, for the sake of clarity in understanding the invention, identical components having identical functions have been designated with identical reference numerals throughout the several Figures illustrated in the drawings.

Figure 1A:
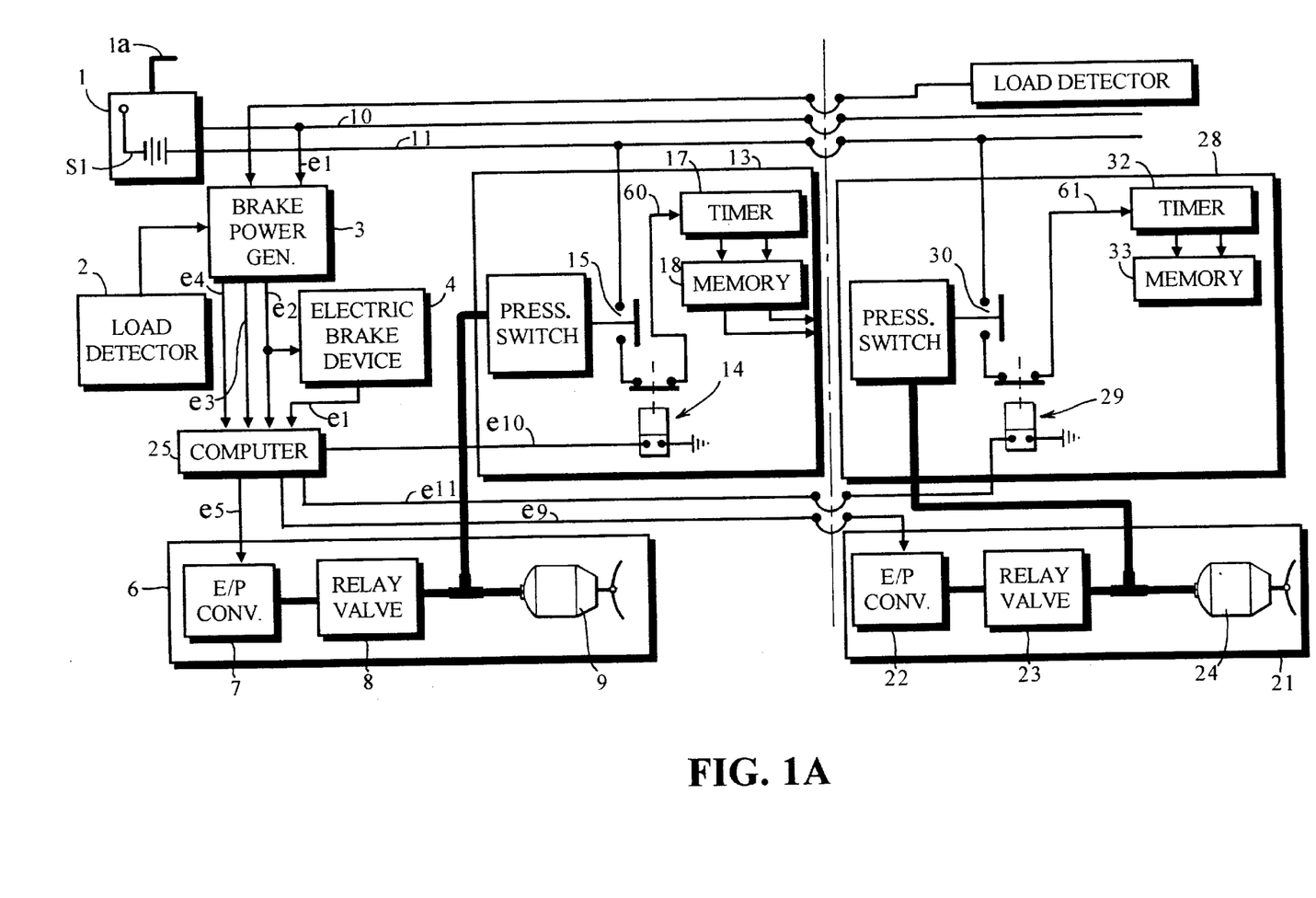
FIG. 1 is a block diagram showing the configuration of a brake monitoring device and a brake device according to a presently preferred embodiment of the invention.
Figure 1B:
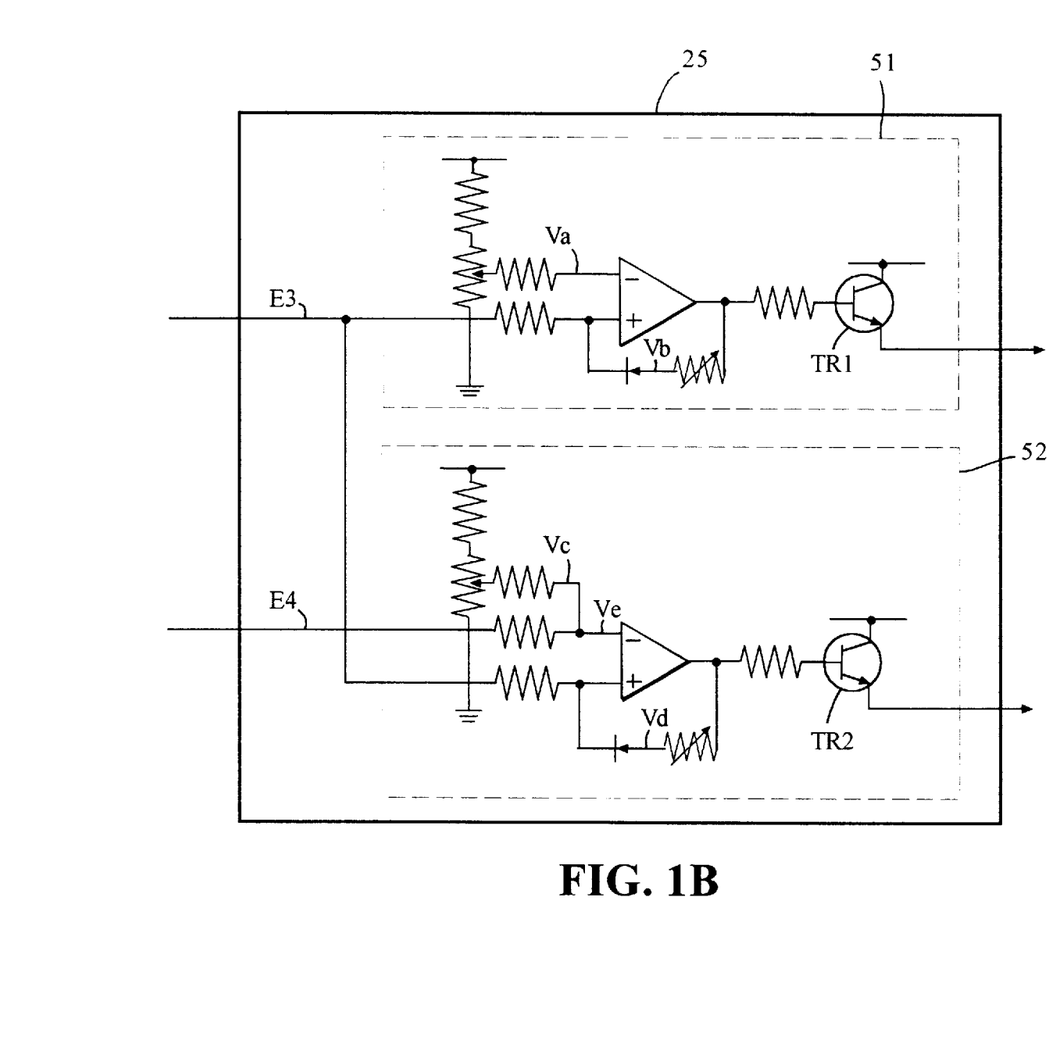
Figure 2:
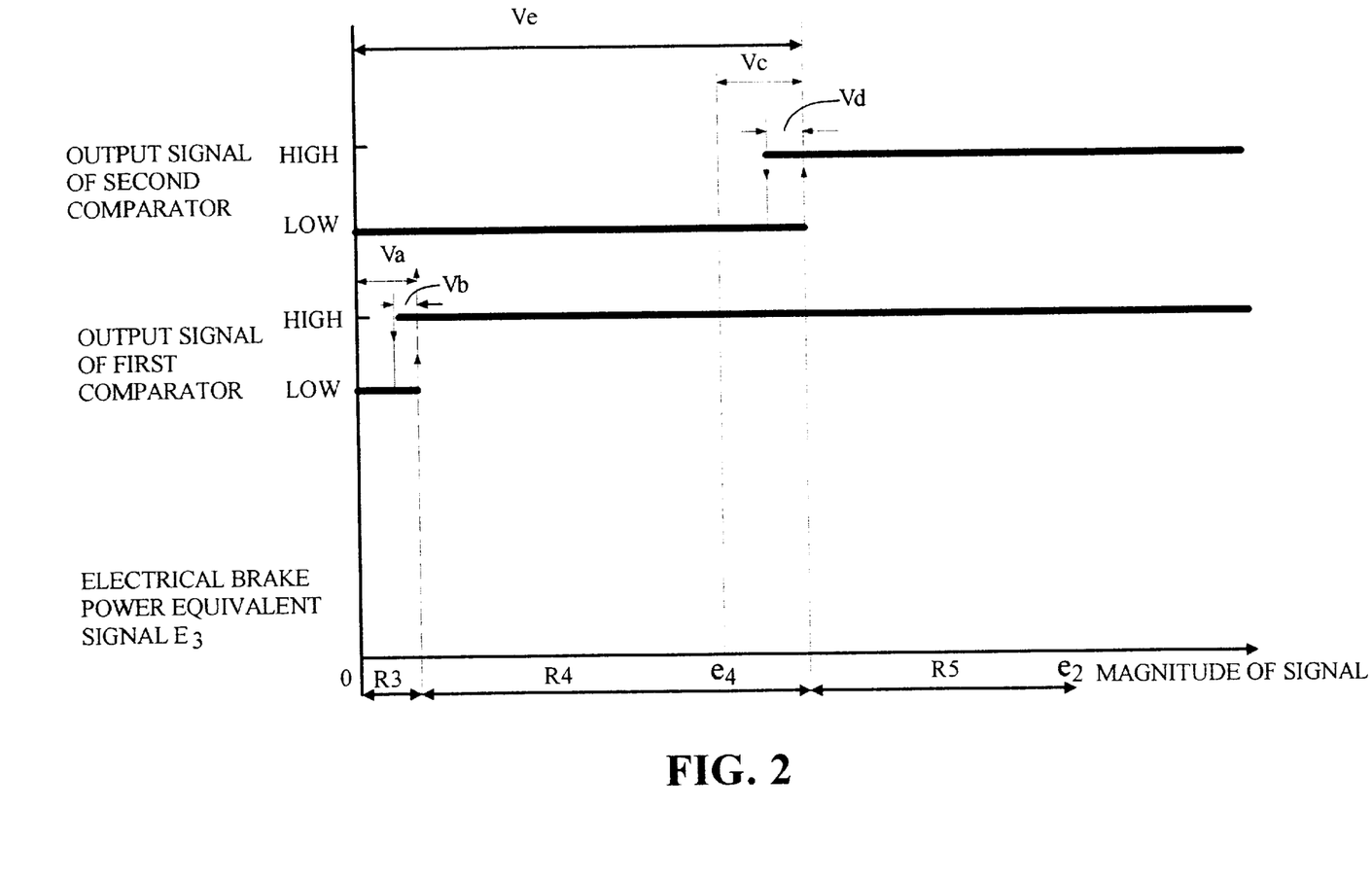
FIG. 2 is an interlock operation diagram of a brake monitoring device according to the present invention.

In the following, an embodiment of the present invention is described with reference to the Figures. FIG. 1 is a block diagram showing the configuration of a brake monitoring device and a brake device according to the present invention, FIG. 2 is an interlock operation diagram of such brake monitoring device, and FIG. 3 is a figure showing the relationship between electrical control rate and brake power, illustrating the effect of such brake monitoring device. Note that in FIG. 1 through FIG. 3, parts having the same action as in FIGS. 4 through FIG. 6 are given the same reference numbers, and their further description is omitted.

First of all, the configuration is described based on FIG. 1. In FIG. 1, the differences from FIG. 4 are that in FIG. 4 the electrical control availability signal $e_7$ from electrical brake device 4 is input to first interlock relay 14 and second interlock relay 29, whereas in FIG. 1 first comparison means 51 and second comparison means 52 are provided in computer 25 and first monitoring signal $e_{10}$ and second monitoring signal $e_{11}$ from these first comparison means 51 and second comparison means 52 are, respectively, input into first interlock relay 14 and second interlock relay 29.

In the first comparison means 51, electrical brake power equivalent signal $e_3$ is input into the positive input terminal of first comparator 41 and first setting value Va is input into the negative input terminal and the output Vb of a hysteresis part 43 is also fed back to the positive input terminal. First setting value Va is a standard value (first standard value) that is set so as to reliably judge the generation of electrical brake power. The output of first comparator 41 is input to the base of transistor TR1, and the output of TR1 is input to first interlock relay 14 as first monitoring signal $e_{10}$. Note that hysteresis part 43 is provided to stabilize the control and is not an essential element of the configuration.

In second comparison means 52, electrical brake power equivalent signal $e_3$ is input to the positive input terminal of second comparator 42, and the sum signal Ve of the brake power command signal $e_4$ required by the locomotive and second setting value Vc is input to the negative input terminal, and the output Vd of hysteresis part 44 is also fed back to the positive input terminal. Second setting value Vc is a leeway value that is set so as to reliably define the supply of trailer car brake power by the electrical brake. Thus, the summation of this second setting value with the brake power command signal $e_4$ required by the locomotive is a standard value (second standard value) that judges whether or not electrical brake power is supplied to the brake power of such trailer car.

The output of second comparator 42 is input to the base of transistor TR2, and the output of TR2 is input to second relay 29 as second monitoring signal $e_{11}$. Note that hysteresis part 44 is also provided to stabilize the control, and is not an essential element of the configuration.

Next, the operation of first and second comparison means 51 and 52, and brake monitoring devices 13 and 28 is described based on FIG. 1 and FIG. 2. In FIG. 2, when the electrical brake power equivalent signal is less than first set value Va (range R3), the output of the first comparator means 51 becomes "LOW", the transistor turns off, the first monitoring signal $e_{10}$ of FIG. 1 is cleared, first relay 14 is demagnetized, its contact points are closed, and brake deficit check circuit 60 is closed, so that if a voltage is applied to brake check line 11, the pneumatic brake power deficit of the locomotive is monitored.

Also, the output of the second comparator means 52 becomes "LOW", the transistor turns off, second monitoring signal $e_{11}$ of FIG. 1 is cleared, second interlock relay 29 is demagnetized, its contact points are closed, and brake deficit check circuit 61 is closed, so that if a voltage is applied to brake check line 11 the pneumatic brake power deficit of such trailer car is monitored. Note that as shown in the figure, the control is stabilized when the electrical brake power equivalent signal takes the value close to first setting value Va due to the presence of hysteresis voltage Vb.

When the electrical brake power equivalent signal is above first setting value Va and is less than the value obtained by adding second setting value Vc to the brake power command signal $e_4$ required by such locomotive (range R4), the output of the first comparator means 51 becomes "HIGH", the transistor turns on, first monitoring signal $e_{10}$ of FIG. 1 is output, first interlock relay 14 is magnetized and its contact points are opened, and brake deficit check circuit 60 is opened, so that even if voltage is applied to brake check lines 11, the pneumatic brake power deficit of the locomotive is not monitored. On the other hand, the pneumatic brake power deficit of the trailer car is monitored in the same way as above.

When the electrical brake power equivalent signal is above the value obtained by adding second setting value Vc to the brake power command signal $e_4$ required by the locomotive (range R5), the output of the second comparator means 52 becomes "HIGH", the transistor turns on, second monitoring signal $e_{11}$ of FIG. 1 is output, second interlock relay 29 is magnetized and its contact points are opened, and brake deficit check circuit 61 is opened, so that even if a voltage is applied to brake check line 11, the pneumatic brake power deficit of such locomotive is not monitored. On the other hand, the pneumatic brake power deficit of such locomotive is also not monitored as described above.

Note that as shown in the figure, the control is stabilized when the electrical brake power equivalent signal takes a value close to the value obtained by adding second setting value Vc to the brake power command signal $e_4$ required by such locomotive due to the existence of hysteresis voltage Vd.

Figure 3A:
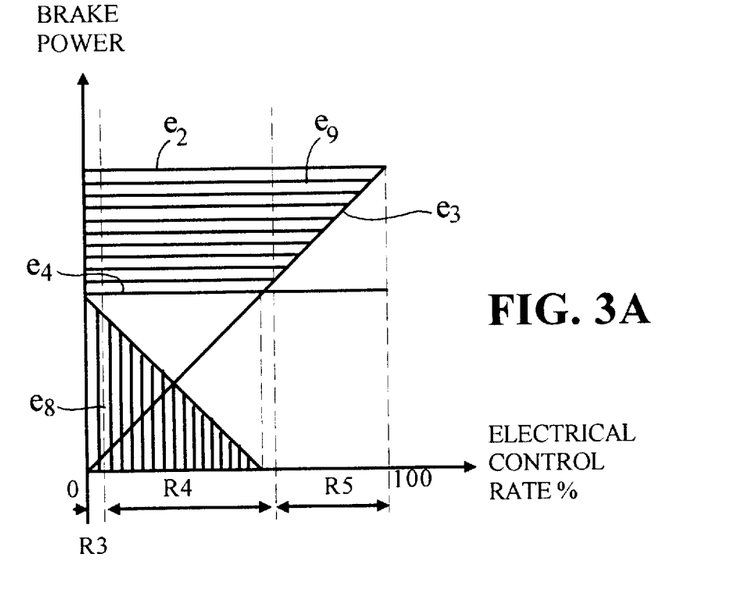
FIG. 3 is a figure showing the relationship between brake power and electrical control rate, illustrating the effect of the brake monitoring device of the present invention.
Figure 3B:
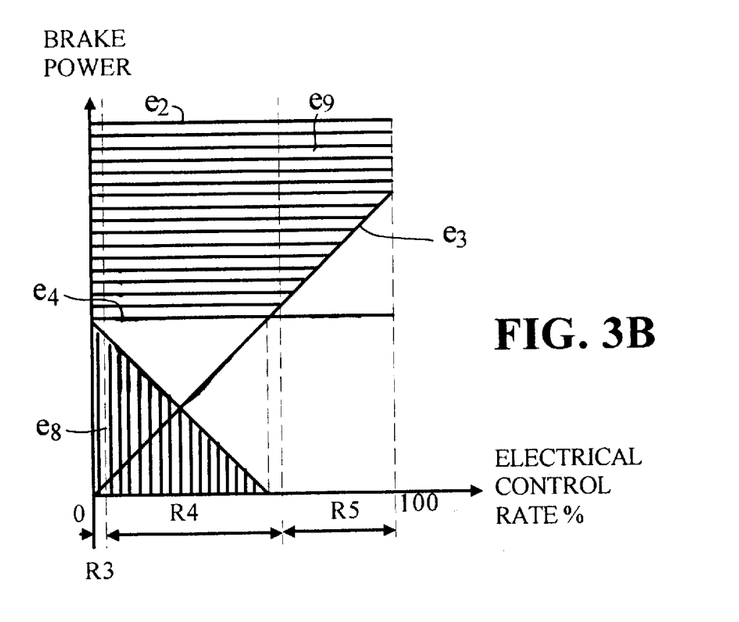

This control is described based on FIG. 3a and FIG. 3b, which show the distribution of supplementary pneumatic brake power and the electrical control rate in the cases of low notch and high notch. In FIG. 3a and FIG. 3b, the pneumatic brake power deficits of both such locomotive car and such trailer car are monitored when electrical brake power is not reliably generated (range R3). When the electrical brake power is supplied only by the brake power of such locomotive (range R4), the pneumatic brake power deficit of such trailer car is monitored. Also, when electrical brake power is also reliably supplied by the brake power of such trailer car (range R5), the pneumatic brake power deficits of both such trailer car and such locomotive are monitored. In this way, in each of such trailer car and such locomotive, the pneumatic brake power deficit is monitored when the electrical brake power does not act synchronously with the supplementary pneumatic brake power, and it is thereby possible to greatly increase the safety of delayed-action control.

Note that in the above-mentioned embodiment, the case where first comparison means 51 and second comparison means 52 of FIG. 1 are provided on computer 25 is described, but the same effect can be achieved by providing them independently (separately from computer 25), or by providing them inside electrical brake device 4.

As described above, a brake monitoring device for railroad cars according to the present invention is provided with a first comparison means 51 that compares the electrical brake power equivalent signal $e_3$ with a first standard value and closes or opens a brake power deficit check circuit 60 with an interlock relay means 14 according to the presence or absence of the generation of electrical brake power, and a second comparison means 52 that compares the electrical brake power equivalent signal $e_3$ with a second standard value and opens or closes a trailer car brake power deficit check circuit 61 with an interlock relay means 29 according to whether or not electrical brake power is supplied to the trailer car, and thus in cases where brake power is not supplied to such trailer car even if electrical brake power is generated, since the pneumatic brake power deficit of such trailer car is monitored, it is thus possible to greatly improve the safety and simplicity of the delayed-action control brake device.

While a presently preferred embodiment of the present invention has been described in detail above, it should be understood that various other adaptations and/or modifications of the invention can be made by those persons who are particularly skilled in the railroad art related to braking systems without departing from either the spirit of the invention or the scope of the amended claims.

We claim:

1. A brake system for a train having at least one locomotive and at least one trailer car, said brake system comprising:

(a) a brake controller means disposed on such locomotive for transmitting a brake command signal according to a manipulated variable and a pneumatic brake deficit check line signal;

(b) a brake power generator means disposed on such locomotive connected to receive said brake command signal from said brake controller means for transmitting a brake power signal required by such locomotive, a brake power signal required by such trailer car and a composite brake power command signal equal to a sum of said brake power signal required by such locomotive and said brake power signal required by such trailer car;

(c) computer means disposed on such locomotive connected to receive said brake power signal required by such locomotive, said brake power signal required by such trailer car and said composite brake power command signal equal to a sum of said brake power signal required by such locomotive and said brake power signal required by such trailer car for generating and communicating a locomotive supplementary pneumatic brake power command signal, a trailer car supplementary pneumatic brake power command signal, a first monitoring signal and a second monitoring signal;

(d) an electrical brake device connected to receive said composite brake power command signal equal to a sum of said brake power signal required by such locomotive and said brake power signal required by such trailer car for generating and communicating an electrical brake power equivalent signal to said computer means;

(e) a pneumatic brake device disposed on such locomotive connected to receive said locomotive supplementary pneumatic brake power command signal for generating and communicating a brake power signal corresponding to a difference between electrical brake power and overall brake power;

(f) a pneumatic brake device disposed on such trailer car connected to receive said trailer car supplementary pneumatic brake power command signal for generating and communicating a brake power signal corresponding to a difference between electrical brake power and overall brake power;

(g) a monitoring device disposed on such locomotive connected to receive said pneumatic brake deficit check line signal transmitted from said brake controller means, said brake power signal from said locomotive pneumatic brake device and said first monitoring signal from said computer, for monitoring output status of such locomotive brake device and for generating and communicating a signal for at least one of opening and closing a brake deficit check circuit for such locomotive; and (h) a monitoring device disposed on such trailer car connected to receive said pneumatic brake deficit check line signal transmitted from said brake controller means, said brake power signal from such trailer car pneumatic brake device and said second monitoring signal from said from said computer for monitoring output status of such trailer car brake device and for generating and communicating a signal for at least one of opening and closing a brake deficit check circuit for such trailer car.

2. A brake system for a train having at least one locomotive and at least one trailer car, as claimed in claim 1, wherein said computer means of said brake system includes a first comparator and a second comparator connected to receive said electrical brake power equivalent signal and said brake power command signal required by such locomotive, for comparing said electrical brake power equivalent signal with a first standard value and with a second standard value, respectively, and for generating and communicating said first monitoring signal and said second monitoring signal, respectively.

3. A brake system for a train having at least one locomotive and at least one trailer car, as claimed in claim 2, wherein said first comparator and said second comparator of said brake system further includes a hysteresis unit connected to receive output signals from said first comparator and said second comparator, respectively, for stabilizing control of said brake system by generating and communicating an output signal to a positive input terminal of said first comparator and said second comparator, respectively.

4. A brake system for a train having at least one locomotive and at least one trailer car, as claimed in claim 1, wherein said monitoring device disposed on such locomotive of said brake system includes an interlock relay means connected to receive said brake deficit check line signal and said first monitoring signal for monitoring output status of such locomotive brake device and for generating and communicating a signal for at least one of opening and closing said brake deficit check circuit for such locomotive.

5. A brake system for a train having at least one locomotive and at least one trailer car, as claimed in claim 4, wherein said monitoring device disposed on such locomotive of said brake system further includes a pressure detecting switch connected to receive said brake deficit check line signal and said pneumatic brake power signal from said locomotive pneumatic brake device, for monitoring pressure in such brake cylinder and for opening when brake cylinder pressure exceeds pneumatic brake deficit detection pressure and for closing when said brake cylinder pressure is below a pneumatic brake deficit detection pressure.

6. A brake system for a train having at least one locomotive and at least one trailer car, as claimed in claim 5, wherein said monitoring device disposed on such locomotive of said brake system further includes a timer connected to receive said pneumatic brake deficit check line signal transmitted from said brake controller means when said pressure detecting switch is closed and for generating and communicating a time limit.

7. A brake system for a train having at least one locomotive and at least one trailer car, as claimed in claim 6, wherein said monitoring device disposed on such locomotive of said brake system further includes a memory circuit connected to receive a time limit signal from said timer and for storing a time limit and communicating a pneumatic brake deficit after said time limit.

8. A brake system for a train having at least one locomotive and at least one trailer car, as claimed in claim 1, wherein said monitoring device disposed on such trailer car of said brake system further includes an interlock relay means connected to receive said brake deficit check line signal and said second monitoring signal for monitoring output status of such trailer car brake device and for generating and communicating a signal for at least one of opening and closing said brake deficit check circuit for such trailer car.

9. A brake system for a train having at least one locomotive and at least one trailer car, as claimed in claim 8, wherein said monitoring device disposed on such trailer car of said brake system further includes a pressure detecting switch connected to receive said brake deficit check line signal and said pneumatic brake power signal from said trailer car pneumatic brake device, for monitoring pressure in such brake cylinder and for opening when brake cylinder pressure exceeds pneumatic brake deficit detection pressure and for closing when said brake cylinder pressure is below a pneumatic brake deficit detection pressure.

10. A brake system for a train having at least one locomotive and at least one trailer car, as claimed in claim 9, wherein said monitoring device disposed on such trailer car of said brake system further includes a timer connected to receive said pneumatic brake deficit check line signal transmitted from said brake controller means when said pressure detecting switch is closed and for generating and communicating a time limit.

11. A brake system for a train having at least one locomotive and at least one trailer car, as claimed in claim 10, wherein said monitoring device disposed on such trailer car of said brake system further includes a memory circuit connected to receive a time limit signal from said timer and for storing a time limit and communicating a pneumatic brake deficit after said time limit.

12. A brake system for a train having at least one locomotive and at least one trailer car, as claimed in claim 1, wherein said brake system further includes a locomotive load response apparatus for generating and communicating a locomotive load to said brake power generator.

13. A brake system for a train having at least one locomotive and at least one trailer car, as claimed in claim 1, wherein said brake system further includes a trailer car load response apparatus for generating and communicating a trailer car load to said brake power generator.

\* \* \* \* \*